Aug. 27, 1946.  B. L. DAVIES  2,406,592
LIQUID CONTAINER SUCH AS THOSE OF ELECTRIC ACCUMULATORS
Filed May 25, 1943

Inventor
B. L. Davies
By Glascock Downing
Attys.

Patented Aug. 27, 1946

2,406,592

UNITED STATES PATENT OFFICE 2,406,592

LIQUID CONTAINERS SUCH AS THOSE OF ELECTRIC ACCUMULATORS

Benjamin Lionel Davies, Little Lever, near Bolton, England, assignor to United Ebonite & Lorival Limited, Little Lever, near Bolton, England, a British company Application May 25, 1943, Serial No. 488,422
In Great Britain January 5, 1942

3 Claims. (Cl. 154—43.5)

This invention relates to containers for corrosive liquids, such as fixed and portable acid vessels, including those of electric accumulators, and has for its object the provision of an improved construction of container such that loss of liquid or electrolyte resulting from shock-damage may be minimised or obviated; also to provide an improved method of producing such a container.

Containers for corrosive liquids are commonly made of hard rubber or ebonite (hereinafter termed ebonite for convenience of reference) and to obviate loss of liquid upon sustaining shock-damage, it has been proposed to provide an outer cover of soft vulcanised rubber in the form of a liquid-tight bag which is slipped over the container after manufacture. To avoid sagging, the method involves the stretching of the rubber bag to a limited extent which accelerates ageing of vulcanised rubber. When ribs, pads or other spacing devices are provided on the exterior of the walls of the container in order that a ventilation space shall exist between adjacent containers, the rubber bag detracts from neatness and is disadvantageous inasmuch as the ventilation is obstructed.

It has also been proposed to provide a rubber bag which is separately vulcanised and fitted into the container after manufacture, thus acting as a lining. In this proposal the rubber is not stretched and does not obstruct ventilation but is difficult to manufacture with adequate dimensional accuracy. It is also not easy to fit such a bag into position in a relatively large deep container. Furthermore the upper edges of the bag must be anchored to avoid sagging and this involves difficulty. We have found the protection provided by this device to be good.

A further proposal is to construct the container with a rubber lining built integrally with the walls, the whole being vulcanised together. In the finished container the rubber lining fits perfectly and is firmly attached to the ebonite walls over the whole of their area. Such a lining gives some protection against loss of liquid when submitted to shock but it has been found that where cracking of the ebonite occurs giving rise to sharp or jagged edges, the rubber lining tends to be cut or torn.

Rubber-lined accumulator containers in which the rubber adheres tightly to the hard rubber or ebonite are not satisfactory, for cracking of the ebonite involves tearing or cutting of the rubber. On the other hand if the rubber lining is clear of the ebonite which is particularly the case when a rubber lining is inserted as a bag into an outer container, the air trapped between the lining and the ebonite causes defects which are not wholly eliminated by venting the air space.

The invention comprises the provision of a filling or interply between the lining and the ebonite which effects during manufacture a joint between the parts so that air is wholly or substantially excluded from between them but which does not join them together in the finished vulcanised article or joins them so weakly that the force required to part them is much less than that required to break the ebonite so that when the container is subjected to shock, which may cause the ebonite to crack, the lining which remains soft after vulcanisation acts as if it were loose and unattached to the ebonite.

The invention further comprises anchoring the ebonite to the lining at the open end of the container or at an opening or branch upon the container by omitting the filling or interply between the lining and ebonite at such part or parts.

The invention further comprises the method of producing a lined ebonite container in which a core or former of external shape corresponding to the interior of the container is covered with a thin layer (which may be multi-ply) of vulcanisable soft rubber mixture which is then covered partly or completely by a layer or layers of paper coated, though not impregnated, with rubber solution or a solution of a vulcanisable rubber mix, and dried, the walls of the container which are made wholly or substantially of a vulcanisable ebonite mixture being then built upon the paper covering, the whole being rolled firmly together and then subjected to vulcanisation which leaves the outer walls hard, the lining soft and the paper tendered, weakened or partially disintegrated.

The invention further comprises the method in which the paper covering is shorter than the desired depth of the container so that the lining and walls of the container may come together and be bonded together in a limited area near the open end of the container.

The invention further comprises the method in which the paper covering is omitted at flanges so that the lining and walls are bonded together thereat.

The invention further comprises containers whenever produced by the methods described.

Referring to the accompanying sheet of explanatory drawings.

Figure 1:
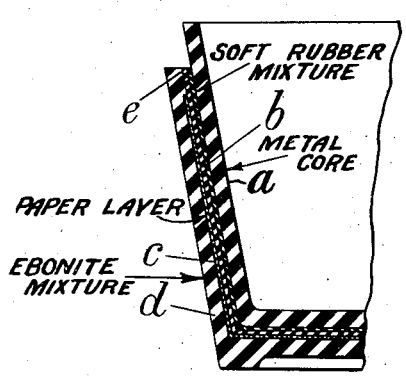
Figures 1 and 2 are sectional views of parts of lined vessels illustrating the method of producing the same in accordance with this invention.

A core or former $a$ is shown in Figure 1 which is formed of steel or cast iron and which, after the formation of the container, is removed therefrom. The core or former corresponds in external shape to the internal shape of the container to be produced and is covered with a thin layer $b$ of vulcanisable soft rubber mixture, preferably made of two plies. This is then covered partially or completely by a layer or layers $c$ of paper which has or have been previously coated on both faces, though not impregnated, with rubber solution or a solution of a vulcanisable rubber mix, and dried. The paper covering may be shorter than the desired depth of the container so that the lining $b$ and ebonite walls $d$ of the container may come together and be bonded the one to the other in a limited area $e$ near the open top of the container. The walls $d$ which are made wholly or substantially of a vulcanisable ebonite mixture are then built upon the paper covering $c$, the whole being rolled firmly together in order to effect complete or substantially complete exclusion of air from between the various layers which will form the finished container. The structure is now subjected to vulcanisation, preferably in steam, which leaves the lining $b$ soft, the outer walls $d$ hard, and the paper $c$ tendered, weakened or partially disintegrated. It follows, therefore, that there is substantially no joint made between the lining and ebonite, except at $e$ where the lining $b$ was not covered by paper. The core or former is of course removed when the container has been formed thereon.

The lining may consist of a rubber composition which remains soft after vulcanisation or of a rubber-like synthetic substance which remains soft after vulcanisation or of a non-vulcanisable plastic material which can be rolled into and retains the form of thin sheets which show a tendency to adhere to ebonite. During manufacture of the container the interply adheres to the lining and to the ebonite but such adhesion is substantially destroyed during vulcanisation.

The intermediate layer $c$ may consist of paper or other material of like form, provided it does not effect a bonding of the lining $b$ and ebonite $d$ after vulcanisation has been effected. When the lining is of non-rubber substance, one face of the interply is coated with a solution of that substance or a related substance to effect a joint to the lining, and the other face of the interply is coated with rubber solution to effect a joint with the unvulcanised ebonite composition $d$. In the case where more than one layer of intermediate material $c$ is employed one layer may be adherent to the lining $b$ and another to the ebonite $d$ after vulcanisation. The layers of $c$ are adherent to one another before vulcanisation but must leave the lining $b$ non-adherent thereto after vulcanisation.

Figure 2:
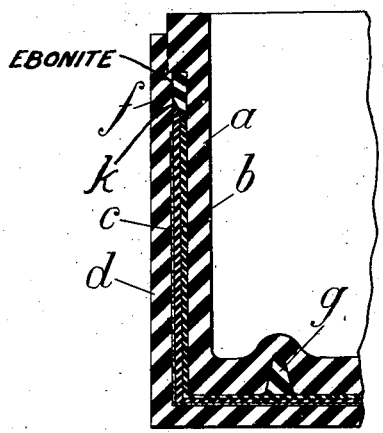

Figure 2 shows a section of part of an electric accumulator cell container. In this instance the upper edge of the lining $b$ which remains soft after vulcanization is protected by first applying a strip $f$ of ebonite stock to the core $a$, lightly attaching it by means of rubber solution. The rests or ribs $g$ in the base of the container are next formed by placing strips of ebonite stock of appropriate cross-section into grooves formed in the base of the core $a$. The lining $b$ which may be of polymerized butadiene is next built on to the core $a$, its upper edge being bevelled as indicated at $k$ to suit the ebonite strip $f$. The interply $c$ of Cellophane or paper is then applied and finally the material to produce the ebonite walls $d$ as before. After vulcanisation the strips $f$ become integral with the container wall $d$. Such strips $f$ which are hard protect the upper edge of the lining $b$ which remains soft.

Figure 3:
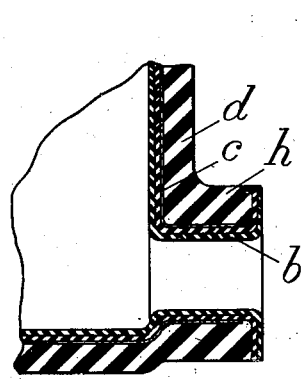
Figure 3 is a sectional view showing how a branch connection on a vessel is produced in accordance with this invention.

Figure 3 shows the application of our invention to the outlet of an acid storage vessel. The container is built up as before by incorporating the paper interply $c$. The soft rubber lining $b$ is caused to adhere to the face $h$ of the outlet boss, thus forming a sealing layer for a flanged fitting to be attached.

Figure 4:
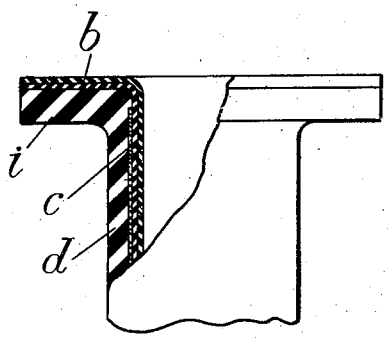
Figure 4 is a sectional elevation of part of a tube or pipe produced in accordance with my invention.

Figure 4 shows part of a liquid container of tubular form made in accordance with the present invention. The ebonite tube $d$ is built as before on a cylindrical core, and there being a soft rubber lining $b$ with paper interply $c$, the latter being cut shorter than the lining so that a soft rubber facing is provided which is permanently attached to the flanges as $i$.

With my improvement, where the lining $b$ does not adhere to the ebonite $d$, if the latter is fractured by a violent blow, I have found that the lining $b$ is free to stretch over a considerable area on each side of the fracture and therefore does not tear. In addition, I obviate the serious defects which arise during manufacture if air is trapped between the inner and outer layers of the container.

What I claim is:

1. The method of producing a lined ebonite container in which a core of external shape corresponding to the interior of the container is covered with a thin layer of vulcanisable soft rubber mixture which is then covered by a layer or layers of paper coated, though not impregnated, with a solution of a vulcanisable rubber mix, and dried, the walls of the container which are made of a vulcanisable ebonite mixture being then built upon the paper covering, the whole being rolled firmly together and then subjected to vulcanisation which leaves the outer walls hard, the lining soft and the paper partially disintegrated.

2. The method of claim 1 in which the paper covering is shorter than the desired depth of the container so that the lining and walls of the container may come together and be bonded together during vulcanization in a limited area near the open end of the container.

3. The method of claim 1 in which the paper covering is omitted at flanges so that the lining and walls are bonded together thereat during vulcanization.

BENJAMIN LIONEL DAVIES.